March 26, 1935. C. V. FOULDS 1,995,299
MEANS FOR CONTROLLING SURGE PRESSURES
Filed Feb. 18, 1931 2 Sheets-Sheet 1
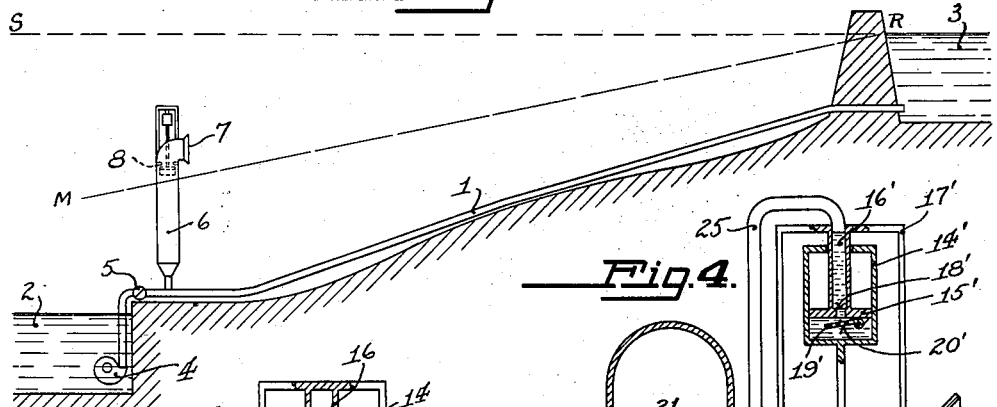
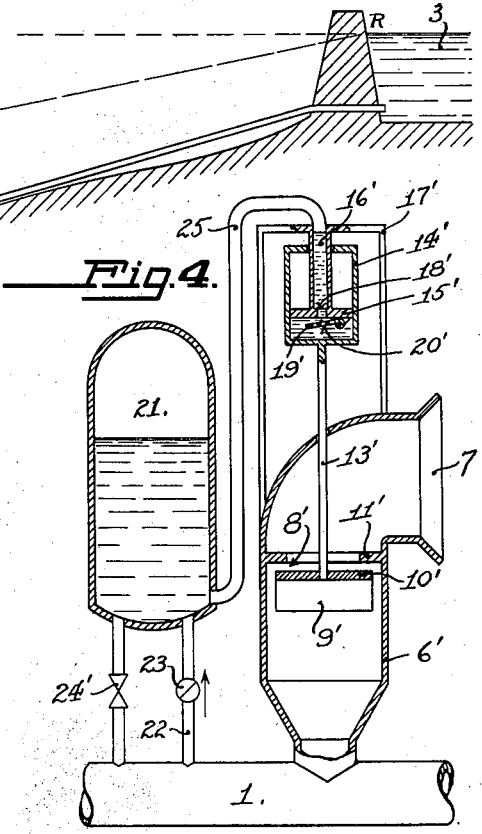
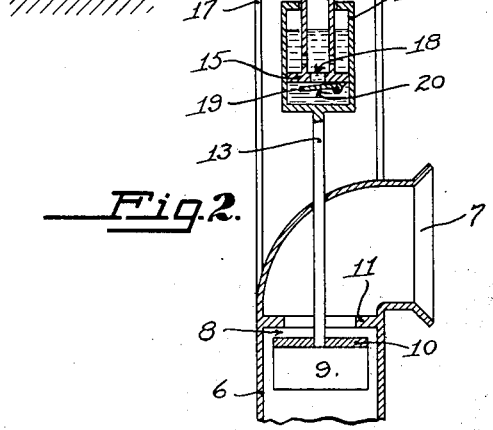
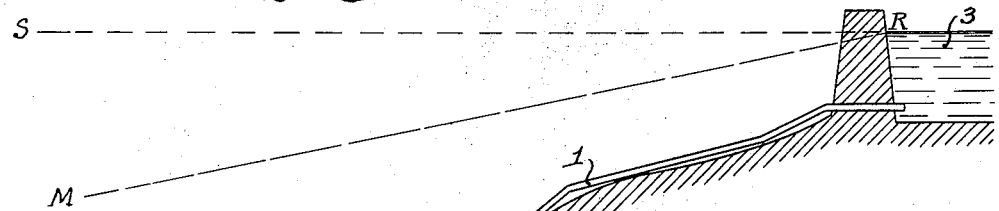
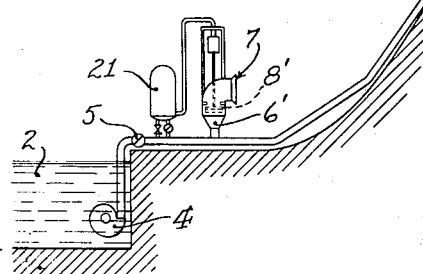
INVENTOR,
Charles V. Foulds,
BY Booth & Booth
ATTORNEYS.

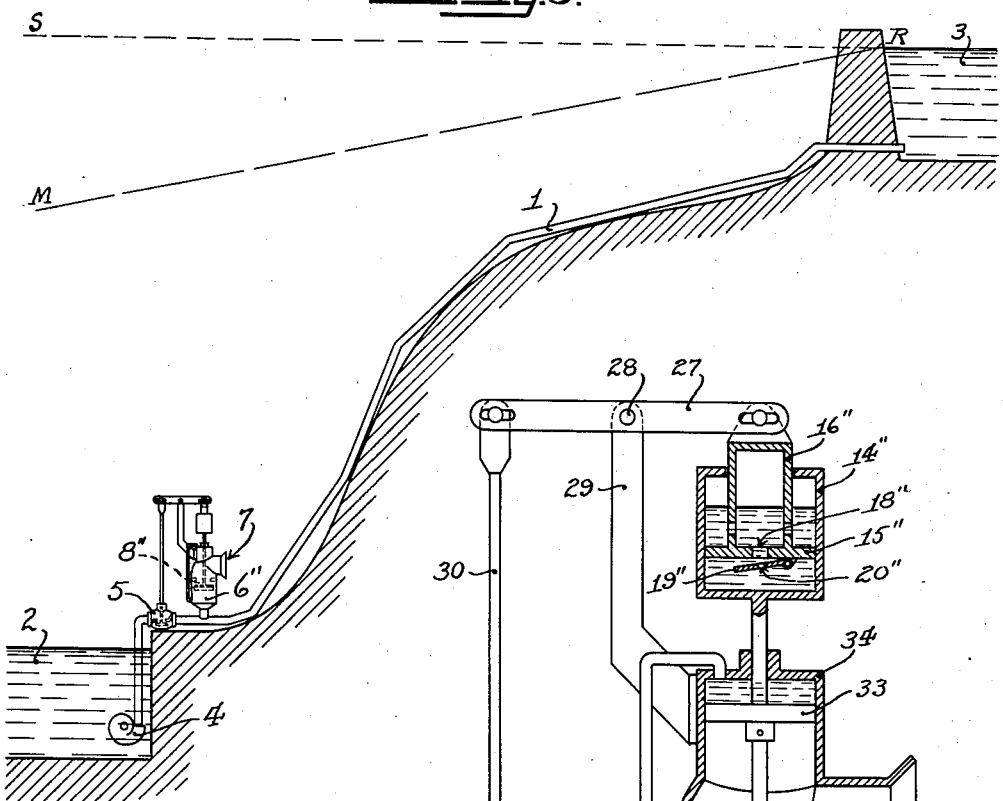
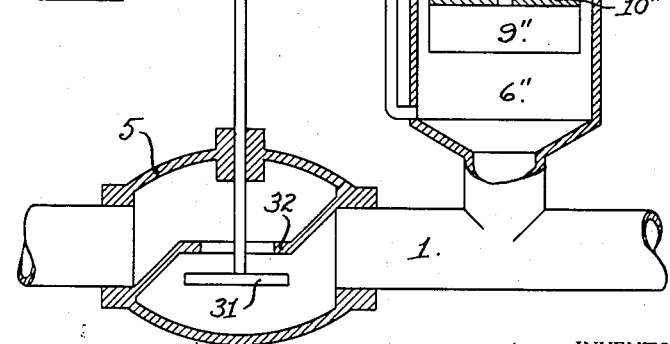

Patented Mar. 26, 1935

1,995,299

UNITED STATES PATENT OFFICE 1,995,299

MEANS FOR CONTROLLING SURGE PRESSURES

Charles V. Foulds, Berkeley, Calif., assignor to The Pelton Water Wheel Company, San Francisco, Calif., a corporation of California Application February 18, 1931, Serial No. 516,558

24 Claims. (Cl. 137—71)

The present invention relates to means for controlling surges in liquid conveying pipe lines, and constitutes an improvement upon the device for which I have applied for Letters Patent of the United States under date of March 31st, 1930, Serial No. 440,271, now Reissue Patent No. 18,969, reissued October 17, 1933.

The objects of the present invention are the same, in general, as those described in my said prior application, viz:—to suppress the destructive pressure surges occurring in pipe lines, especially pumping lines of considerable length, upon the sudden stopping of the pump or cessation of flow. More specifically, the objects of the present invention are to provide surge controlling means applicable to a wide range of conditions of static and pumping pressure, and which, after being set in operation by the cessation of flow or stopping of the pump, will continue to function, independently of subsequent starting of the pump, until the surge conditions have been suppressed or reduced to harmless values.

My invention will be fully described with reference to the accompanying drawings, which illustrate, by way of example, three closely related embodiments of the invention, and in which Figs. 1, 3 and 5 are diagrams showing typical installations of said three embodiments, respectively.

Figs. 2, 4 and 6 are vertical sectional diagrams of the respective relief valves used in the installations shown in Figs. 1, 3 and 5.

In the drawings, the reference numeral 1 designates a pipe line through which water is pumped from a lower reservoir 2 to a higher reservoir 3 by means of a pump 4 driven by any suitable power means, not shown. The usual check valve at or near the discharge of the pump is indicated at 5, and may be of any desired type. It is well known in the art that upon the sudden stopping of the pump, the pressure in the pipe line will first drop, due to the inertia of the moving column of water, and will then rise again to a value considerably higher than the normal pumping pressure, thus producing an oscillation or surge which may be destructive to the line.

In order to suppress or control said surge, I provide a relief outlet in the pipe line in the region of maximum surge, and said relief outlet is controlled by a valve, to be described hereinafter, which automatically opens upon the stopping of the pump and the consequent initial pressure drop in the line, and remains open long enough to relieve the subsequent pressure rise. The valve is slowly, but positively, closed, and independently of the operation of the pump, to prevent further discharge of the water from the reservoir 3 and to restore the system to normal condition, the slow closing of the valve providing sufficient time for relief of the pressure rise.

The most efficient arrangement is one in which the relief outlet can be located at the top of a stand-pipe extending above the static level of the water in the reservoir 3, as described in my said prior application. Under these conditions, the relief valve can remain open until the surge is entirely dissipated, because when the water comes to rest in the pipe line there will be no further flow from said outlet.

In the majority of installations, however, physical conditions preclude the possibility of a stand-pipe extending above the static level. Therefore, the valve must be provided with means for closing it automatically after a lapse of time sufficient to reduce the surge pressures to harmless values. When physical conditions will permit the installation of a stand-pipe extending part way to the static level of the liquid in the reservoir, as illustrated at 6 in Fig. 1, I prefer to employ a valve of the type shown in Fig. 2, which is opened by the direct action of the water in said stand-pipe, and whose closing is controlled and delayed by any suitable automatic means such as a simple dash-pot mechanism.

In this type of installation, the upper end of the stand-pipe 6, in which is the relief outlet 7, is below the static level, represented by the line S R, but above the minimum surge pressure gradient M R. The relief outlet 7 is opened by a valve 8 as soon as the pressure drops to or below the sub-static gradient M R, and is held open for a sufficient length of time to dissipate a portion of the surge, so that, when said valve again closes, the ensuing pressure rise is not harmful.

A suitable form of valve for this installation comprises a float 9, Fig. 2, positioned within the stand-pipe 6, and having a valve face 10 adapted to co-operate with a seat 11 in the upper end or head of said stand-pipe to form the valve 8 of Fig. 1, said valve controlling the relief outlet 7. A stem 13 is secured to said float and rises therefrom, carrying at its upper end a dash-pot cylinder 14.

A piston 15 is fitted within said cylinder, and is secured in fixed position by a sleeve 16 and a suitable frame 17 rising from the upper end of the stand-pipe. The piston 15 is provided with a port 18, controlled by a check valve 19 having a restricted orifice 20 in line with said port. The cylinder 14 is filled with oil or other suitable liquid, which upon the down stroke of the float passes freely through the port 18 and the then open check valve 19. Upon the up stroke of said float, however, said check valve 19 closes, forcing the oil to flow through the restricted orifice 20, thereby retarding the movement of the cylinder 14 and said float, and delaying the closing of the relief valve 8.

The float 9 is operated by the water in the stand-pipe 6. When the level of said water, due to the initial pressure drop following the cessation of flow in the line 1, falls below the float 9, said float descends, opening the valve 8. Then upon the ensuing rise of water in the stand-pipe, the float rises to close the valve 8, but this closing action is delayed by the resistance of the dash-pot described above. As a result, the valve 8 closes slowly, allowing sufficient water to escape through the relief outlet 7 to prevent a harmful rise of pressure. Any suitable means, not shown, may be provided for regulating the resistance offered by the dash-pot, so that the timing of the closing of the valve 8 can be properly adjusted to secure sufficient reduction of the surge pressure without unnecessary waste of water.

Obviously, the above described relief valve mechanism can be used with a stand-pipe whose outlet is above the static level, as described in my said co-pending application, if it be desired to cause the valve to close independently of the pump operation. When physical conditions prevent the use of a stand-pipe extending above the minimum surge pressure gradient M R, however, satisfactory results are obtained with a relief outlet at or near the level of the pipe line 1, as indicated in Fig. 3, by the use of a valve of the type shown in Fig. 4.

The essential feature of this valve is that it is biased or loaded in order to cause it to open upon a reduction in pressure in the pipe line below the static pressure, even though the reduced pressure at the valve may still have a positive value. Any suitable loading means may be employed. For example, I have shown, in Fig. 4, a valve structure and dash-pot mechanism essentially similar to that of Fig. 2, with the addition of a hydraulic loading device. In this form of valve, a head 9' is housed within a chamber 6' communicating with the pipe line 1, and has a face 10' adapted to cooperate with a seat 11', thus controlling the relief outlet 7. As before, the head 9' (corresponding to the float 9 of Fig. 2) is connected by a stem 13' with a dash-pot cylinder 14', whose piston 15' is held fixed by a stem 16' and a frame 17' rising from the valve chamber 6'. The piston has a port 18' controlled by a check valve 19' with a restricted orifice 20'. In this case, however, the port 18' communicates with the interior of the hollow stem 16'. The dash-pot 15' is of less diameter than the valve head 9'. The loading device comprises an air chamber or accumulator 21 connected with the pipe line 1 by a pipe 22 in which is a check valve 23, adapted to permit free flow of water from the pipe line into the accumulator, but to prevent flow in the reverse direction. An adjustable restricted orifice valve 24' by-passes the check valve 23, so that the water can return slowly from the accumulator 21 to the pipe line. The accumulator is connected by a pipe 25 with the hollow stem 16' of the dash-pot piston.

In this form of the apparatus, during the normal operation of the pump, water passes from the pipe line 1 into the accumulator 21 and thence into the dash-pot 14'. The unit pressure being the same upon the valve head 9' and the dash-pot 14', said valve is held closed because of its greater area. However, when the pressure in the pipe line 1 drops, the sustained original pressure in the accumulator 21, which is temporarily maintained by the check valve 23, causes the relief valve 8' to open. Water then discharges through the relief outlet 7 until the pressure within the accumulator 21, which has been bleeding out slowly through the restricted orifice 24', falls to a value sufficiently close to the pressure in the pipe line 1 to cause the valve 8' to again close. As in the previously described form, the check valve 19' with its restricted orifice 20' prevents sudden closing of the relief valve 8'.

The biasing or loading mechanism is so proportioned and adjusted as to cause the relief valve 8' to open when the pressure in the pipe line drops below the static level. Therefore upon the sudden cessation of flow in said pipe line, said relief valve opens almost immediately, permitting free discharge of water from the relief outlet 7 during a considerable portion of the sub-static surge, as is the case also in the form of installation shown in Figs. 1 and 2. This discharge of water, whose duration can be regulated by the orifice 24 by any suitable means, not shown, for regulating the resistance of the dash-pot, is sufficient to reduce the ensuing pressure rise to a harmless value.

In Figs. 5 and 6, I have shown another modification of the invention adapted especially for installations similar to Fig. 3 in which it is impracticable to erect a stand-pipe of sufficient height to bring the relief outlet 7 above the minimum surge pressure gradient M R. The essential feature of this form of relief valve is that it is mechanically connected with the pump check valve 5, so that when said check valve closes, due to the stopping of the pump, the relief valve is positively opened. The slow closing feature of said relief valve is retained in order to permit sufficient discharge of water to reduce the subsequent pressure rise to a harmless value.

As an example of such mechanism, I have shown in Fig. 6 a valve chamber 6" in which is a valve head 9" having a face 10" adapted to cooperate with a seat 11" to form the relief valve 8" controlling the relief outlet 7, all of which parts are practically identical with those of Fig. 4. The valve head 9" has a stem 13" at the upper end of which is the dash-pot cylinder 14", in which operates a piston 15". The piston is carried upon a stem or sleeve 16" and has a port 18" controlled by a check valve 19" with a restricted orifice 20". The sleeve 16" is connected with a lever 27 which is fulcrumed at 28 upon a fixed support 29, and whose other end is connected by a rod or link 30 with the head or movable member 31 of the pump check valve 5. The check valve head 31 cooperates with a seat 32 in the usual manner to prevent back-flow through the pipe line 1.

I prefer to employ suitable means for partially balancing the relief valve head 9" in order to make it easy to open against the pressure in the valve chamber and pipe line. As an example of such balancing means, I have shown a piston 33 secured upon the stem 13" of the relief valve and operating in a cylinder 34 formed in the upper portion of the valve chamber. The upper end of the cylinder 34 is connected by a pipe 35 with the valve chamber 6" below the valve 8".

The piston 33 is of slightly less area than the valve head 9″ so that said valve is normally held closed by the pressure in the pipe line 1.

In the operation of this form of the invention, when the pump stops, the check valve 5 is immediately closed by upward movement of its head 31, and this movement is communicated through the lever 27 and the dash-pot mechanism to the relief valve head 9″, causing it to move downwardly, thereby opening the relief valve and allowing the water to discharge freely through the outlet 7. The orifice 20″ of the dash-pot permits the relief valve 8″ to close slowly under the action of the pressure in the pipe line, even though the check valve 5 remains closed. Upon the restarting of the pump, the check valve 5 opens without affecting the relief valve 8″, the dash-pot piston 15″ moving up freely in its cylinder 14″. Thus the action of this form of the device is essentially similar to that of the two preceding forms, in that the relief valve opens immediately upon the stopping of the pump, and is closed slowly thereafter to restore the system to normal condition after a sufficient lapse of time to permit reduction of the surge pressures to harmless values.

I claim:—

1. In a hydraulic pipe line subject to pressure surges, said pipe line having a normally closed valve controlled outlet, means for causing said valve to be in an open position during a period of subnormal pressure within said line caused by a down surge whereby said valve is open in advance of a return pressure rise above normal, thereby to provide a free discharge outlet to dissipate the return pressure rise or surge, and means whereby said valve is thereafter closed at a controlled rate.

2. In a pipe line having a hydraulic pump and subject to pressure surges upon discontinuance of the pumping operation, a valve controlled outlet for said pipe line normally closed during pumping operation, means for opening said valve during the existence of pipe line pressure below normal created by a down surge upon stopping of the pumping operation, said valve thereby being opened in advance of a pressure rise above normal so as to provide a free discharge outlet to dissipate a return pressure surge, and means whereby said valve is thereafter closed independently of further pumping operation.

3. In a hydraulic pipe line subject to pressure surges wherein a down surge in pressure is followed by a return pressure rise, a normally closed valve controlled outlet for said pipe line, means for opening said valve in response to a down surge so that said valve is open in advance of a pressure rise above normal thereby providing a free discharge outlet to dissipate a return pressure surge, and means for thereafter closing said valve in response to restoration of pipe line pressure to normal.

4. In combination with a pump and a pipe line system subject to pressure surge, a stand-pipe having a relief outlet above the minimum surge pressure gradient of the system, a valve normally closing said outlet, means whereby said valve opens automatically in response to a drop in pressure within said line created by the momentum of a column of water therein tending to cause continued flow in a normal downstream direction from the valve upon stopping of said pump, thereby to provide an outlet that is open in advance of a return pressure surge to provide a free discharge for the return surge, and means for effecting gradual closing of said valve.

5. In a pipe line system subject to pressure surges wherein a down surge is followed by a return surge, a stand-pipe having a relief outlet below the static pressure level but above the minimum surge pressure gradient of the system, a valve normally closing said outlet, means whereby said valve opens said outet automatically upon a down surge in the pipe line to provide a free discharge for the return surge, and means whereby said valve thereafter closes at a controlled rate.

6. In combination with a hydraulic pump and a pipe line subject to pressure surges, said pipe line having a relief outlet, a valve normally closing said outlet, means for opening said valve upon a down surge within said line while the same is completely filled with liquid and for thereafter automatically reclosing said valve, and dashpot mechanism for delaying said reclosing of said valve during the succeeding pressure rise.

7. The combination set forth in claim 3 further characterized in that said opening means has provision for constantly biasing said valve toward its opening direction.

8. In combination with a pump and a pipe line subject to pressure surges, said pipe line having a relief outlet, a pressure actuated balanced valve mechanism adapted to normally close said outlet, means for unbalancing said valve to cause it to be opened automatically during a down surge within the pipe line and thereafter to be closed automatically, and means for delaying said subsequent closing of said valve thereby to permit substantially free discharge of liquid from said line during a succeeding return surge.

9. In combination with a pump and a pipe line subject to pressure surges, said pipe line having a relief outlet, a check valve in said line between said pump and said outlet, said check valve being automatically controlled by fluid conditions within the line, a relief valve normally closing said outlet, connecting means between said check valve and said relief valve adapted to open said relief valve upon the closing of said check valve, and means for delaying the closing of said relief valve.

10. In combination with a pump and a pipe line subject to pressure surges, said pipe line having a relief outlet, a check valve in said line between said pump and said outlet, said check valve being automatically controlled by fluid conditions within the line, a relief valve normally closing said outlet, connecting means between said check valve and said relief valve adapted to open said relief valve upon the closing of said check valve, and means for causing said relief valve to close slowly in advance of the subsequent opening of said check valve.

11. In a pipe line subject to pressure surges, said pipe line having a relief outlet, a valve normally closing said outlet, said valve being opened automatically upon a drop in pressure in the pipe line created by the inertia of the liquid therein tending to flow in a normal downstream direction from said valve and said valve being closed automatically upon a rise in pressure therein, and retarding means associated with said valve for causing it to close slowly without delaying its opening movement.

12. In a hydraulic pipe line system subject to pressure surges wherein a drop in pressure created by the inertia of a flowing column of water is followed by a pressure rise in said column, said pipe line having a relief outlet disposed below the minimum surge pressure gradient of the system, a valve normally closing said outlet, means whereby said valve opens automatically in response to said drop in pressure in the pipe line to provide a substantially free discharge outlet for the return surge to dissipate the same and is thereafter closed automatically, and means associated with said valve for causing it to close slowly.

13. In a hydraulic pipe line system subject to pressure surges wherein a drop in pressure created by the inertia of a flowing column of water is followed by a pressure rise in said column, said pipe line having a relief outlet disposed below the minimum surge pressure gradient of the system, a valve normally closing said outlet, means whereby said valve opens automatically in response to said drop in pressure in the pipe line to provide a substantially free discharge outlet for the return surge to dissipate the same and is thereafter closed automatically, and means associated with said valve whereby it is adapted to close at a slower rate than its opening movement.

14. In a hydraulic pipe line subject to pressure surges wherein a down surge in pressure created by the inertia of a flowing column of water is followed by a return pressure rise in said column, said pipe line having a relief outlet, a valve normally closing said outlet, and fluid pressure actuating means for moving said valve to open position in response to a down surge thereby to provide a free discharge outlet for the succeeding return surge.

15. The combination set forth in claim 14 further characterized by the provision of means whereby said valve is reclosed when the line pressure has been restored to a predetermined value after a down surge.

16. In a hydraulic pipe line subject to pressure surges wherein a down surge in pressure created by the inertia of a flowing column of water is followed by a return pressure rise in said column, said pipe line having a relief outlet, a valve normally closing said outlet, means for moving said valve to open position by fluid pressure during the down surge to provide a free discharge for the succeeding return surge, and means adapted to be actuated by fluid pressure for thereafter moving said valve to closed position.

17. The combination set forth in claim 16 further characterized in that said fluid pressure means for moving said valve to open position includes piston and cylinder elements, and means for supplying fluid pressure thereto to move said valve in an opening direction.

18. The combination set forth in claim 16 further characterized in that said fluid pressure means for moving said valve to open position includes piston and cylinder elements, means for supplying fluid pressure thereto to move said valve in an opening direction, and means for controlling the exhaust of fluid from said cylinder thereby to control the rate of reclosure of said valve during the succeeding return surge.

19. In a hydraulic pipe line subject to pressure surges wherein a down surge in pressure created by the inertia of a flowing column of water is followed by a return pressure rise in said column, said pipe line having a relief outlet, a valve normally closing said outlet, and means whereby said valve is moved to open position in response to a down surge to provide a free discharge during the succeeding pressure rise, said means having provision for effecting said opening movement by fluid which is under a pressure greater than the pressure existing in the line at least during certain portions of the opening movement.

20. In a hydraulic pipe line subject to pressure surges wherein a down surge in pressure created by the inertia of a flowing column of water is followed by a return pressure rise in said column, said pipe line having a relief outlet, a valve normally closing said outlet, and means whereby said valve is moved to open position in response to a down surge thereby to provide a free discharge during the succeeding return surge, said means including a fluid pressure accumulator for effecting said opening movement of the valve.

21. In a hydraulic pipe line subject to pressure surges wherein a down surge in pressure created by the inertia of a flowing column of water is followed by a return pressure rise in said column, said pipe line having a relief outlet, a valve normally closing said outlet, means whereby said valve is moved to open position in response to a down surge thereby to provide a free discharge during the succeeding return surge, said means including a fluid pressure accumulator for effecting said opening movement of the valve, and means whereby said accumulator is automatically supplied with pressure fluid from the pipe line.

22. In a hydraulic pipe line subject to pressure surges wherein a down surge in pressure created by the inertia of a flowing column of water is followed by a return pressure rise in said column, said pipe line having a relief outlet, a valve normally closing said outlet, means whereby said valve is moved to open position in response to a down surge thereby to provide a free discharge during the succeeding return surge, said means including a fluid pressure accumulator for effecting said opening movement of the valve, and means providing for restricted discharge of fluid from said accumulator during said return surge.

23. In a hydraulic pipe line subject to pressure surges wherein a down surge in pressure created by the inertia of a flowing column of water is followed by a return pressure rise in said column, said pipe line having a relief outlet, a valve normally closing said outlet, means whereby said valve is moved to open position in response to a down surge thereby to provide a free discharge during the succeeding return surge, said means including a fluid pressure accumulator for effecting said opening movement of the valve, and means providing for free flow of fluid to said accumulator from said line and restricted flow from the accumulator to the line.

24. In a hydraulic pipe line subject to pressure surges wherein a down surge in pressure is followed by a return pressure rise, said pipe line having a relief outlet, a valve normally closing said outlet, and means responsive to a down surge for effecting a free discharge through said outlet during the return surge, said means including a fluid pressure piston and cylinder for moving said valve by fluid pressure and means for controlling the rate of fluid flow relative to said cylinder to effect a predetermined rate of movement of the valve.

CHARLES V. FOULDS.